Feb. 5, 1963  A. D. LANTZ ET AL  3,076,863
SUSPENSION APPARATUS FOR BUNDLE CONDUCTORS
Filed April 21, 1960  4 Sheets-Sheet 1

INVENTORS
ROBERT W. HARMON &
ALPHA D. LANTZ
BY
ATTORNEY

Feb. 5, 1963 A. D. LANTZ ET AL 3,076,863
SUSPENSION APPARATUS FOR BUNDLE CONDUCTORS
Filed April 21, 1960 4 Sheets-Sheet 2

INVENTORS
ROBERT W. HARMON &
ALPHA D. LANTZ
BY
Kenneth W Miller
ATTORNEY

INVENTORS
ROBERT W. HARMON &
ALPHA D. LANTZ
BY
ATTORNEY

Feb. 5, 1963 A. D. LANTZ ET AL 3,076,863
SUSPENSION APPARATUS FOR BUNDLE CONDUCTORS
Filed April 21, 1960 4 Sheets-Sheet 4

INVENTOR.
ROBERT W. HARMON &
ALPHA D. LANTZ
BY
ATTORNEY

United States Patent Office 3,076,863
Patented Feb. 5, 1963

3,076,863
SUSPENSION APPARATUS FOR BUNDLE
CONDUCTORS
Alpha D. Lantz, Barberton, and Robert W. Harmon,
Doylestown, Ohio, assignors to The Ohio Brass Company, Mansfield, Ohio, a corporation of New Jersey
Filed Apr. 21, 1960, Ser. No. 23,737
28 Claims. (Cl. 174—141)

This invention relates to power transmission lines and more particularly to lines constituted by a plurality of part conductors connected and arranged as a single or phase conductor of the line.

In transmitting electric power by means of open wire lines, it is known to use various shielding devices in connection with the suspension apparatus. Such shielding devices, control rings and the like, divide the impressed voltages and effect a distribution of the electrical stresses between the several insulators of the suspension insulators utilized to insulate the line conductor from the tower or other supporting structure. In the absence of such control devices, the voltage drop across the insulators tends to increase in accordance with the proximity of the insulator to the line conductor.

The present invention relates to stress control and voltage grading in transmission lines and particularly those lines in which a plurality of part conductors are connected and arranged as a single or phase conductor of a line, otherwise known as bundle conductors. In bundle conductors, a plurality of conductor cables are carried by a suspension plate which is suspended from a string of suspension insulators. The suspension plate carries the cables in laterally and vertically spaced disposition and maintains the disposition of the cables so as to achieve the desired voltage distribution and gradient necessary for high tension operation. We have found that in such bundle arrangements, the disposition of the conductors with respect to the suspension insulators, in particular the top conductors, has an important effect upon the voltage distribution on the insulators of the suspension string.

According to the invention, a desirable arrangement of the conductor cables is accomplished by suspending the cables from a suspension plate or plates having two arms which extend equally and oppositely from the body of the suspension plate in the transverse direction and equally in the direction of suspension insulators so that the two top cables are disposed closely adjacent the adjacent one of the suspension insulators.

With this arrangement, the suspension plate and cables may be suspended from a single string of insulators and the division of electrical stresses as between the insulators is such that no separate shielding or control devices are necessary, even for very high voltages. Arrangements utilizing a pivotal connection between the suspension insulators and the suspension plate incorporate the teachings of A. D. Lantz application Ser. No. 23,828 filed April 21, 1960, for achieving mechanical stability in the suspension apparatus.

Other embodiments of the invention useful in connection with two or more conductor cables arranged as bundle conductor systems in which a plurality of suspension insulator strings are utilized are described herein. In each instance the arrangement of the top conductor cables or cables, with respect to the insulators, is such that an advantageous division and distribution of the electric stresses as between the insulators of the insulator string or strings is achieved.

In one embodiment of the invention disclosed herein, the arms extend re-entrantly toward the suspension insulators from the greatest transverse extent of the suspension plate so that the two upper conductor cables are carried closely adjacent the insulators. The exterior portions of the suspension plate provide arcing protection and, where desired, may be contoured to function as control surfaces.

The suspension plate constructions described herein are advantageous in respect to the angles of swing which may be accommodated without contact between insulator and suspension plate.

The invention together with the objects, features and advantages thereof will be understood from the following detailed specification and claims taken in connection with the appended drawings. In the drawings:

Figure 1:
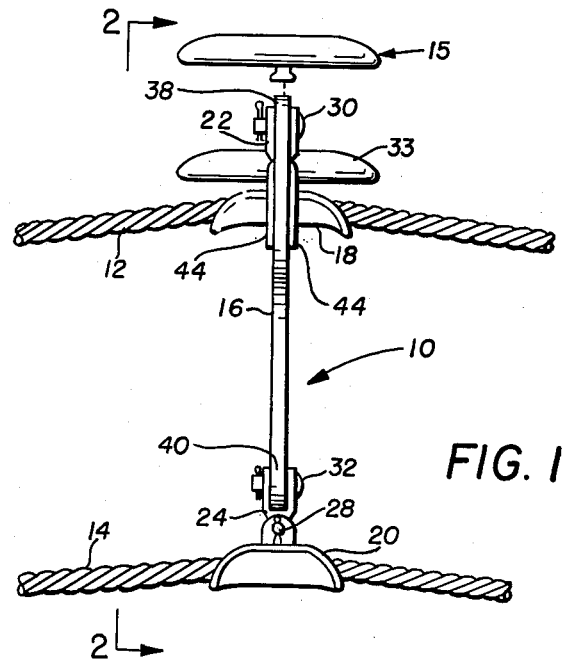
FIG. 1 is a side elevation view of a suspension apparatus and bundle conductor constructed in accordance with the invention.
Figure 2:
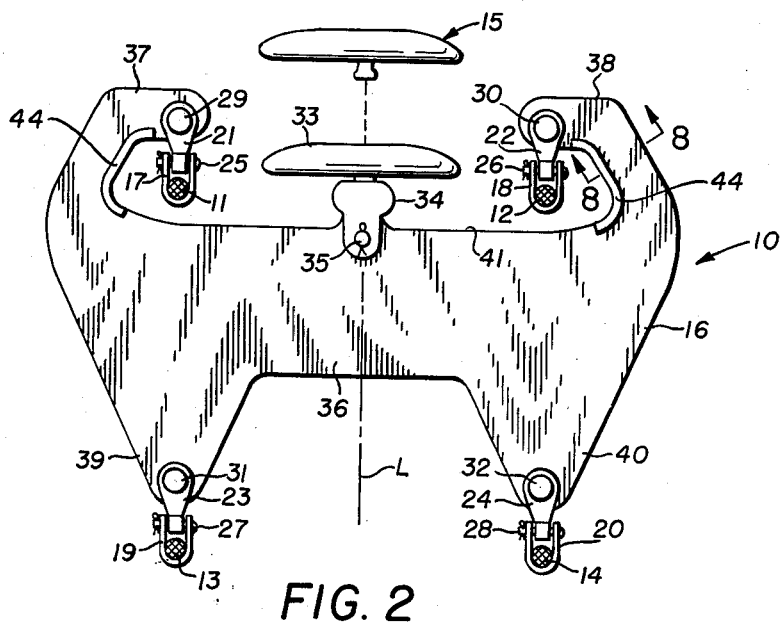
FIG. 2 is a view of the suspension apparatus of FIG. 1 taken in the direction 2—2 in FIG. 1, showing the suspension plate and the disposition of the conductor cables.

Referring now to FIGS. 1 and 2, there is shown a transmission line apparatus 10 in which four conductor cables 11, 12, 13 and 14 are carried by means of a string 15 of suspension insulators. The conductors 11 to 14 are carried from a suspension plate 16 by means of suspension clamps 17, 18, 19 and 20. The clamps 17 to 20 are connected to the suspension plate 16 by means of links 21, 22, 23 and 24, pins 25, 26, 27 and 28 and pins 29, 30, 31 and 32. The suspension plate 16 is connected to the end insulator 33 of the insulators 15 by means of a socket link 34 and pin 35. The link 34 is formed as a socket connector at the top extremity thereof for receiving a ball connector of the insulator 33, and as a clevis at the bottom end to receive the pin 35 which extends through the link and the strain plate.

The suspension plate 16 is constituted as a unitary body 36 having two upper suspension arms 37 and 38 and two lower suspension arms 39 and 40. The two upper suspension arms 37 and 38 extend symmetrically inward toward the insulators 15 from the lateral extremities of the body 36 of the plate. The arms are spaced from the upper edge of the body 36 to define a central recess 41 in which the insulators 15 and the conductor cables 11 and 12 and the associated suspension apparatus are received. The arms 37 and 38 are referred to herein as reentrant arms and the spacing between the upper arms and the extremities of the body 36 is sufficient to accommodate movements of the conductor cables.

The arms 39 and 40 extend symmetrically downward from the body 36 equally at transversely opposite sides of the body. The lateral spacing of the arms 39 and 40 is such that the conductor cables 13 and 14 are in vertical alignment with the conductor cables 11 and 12, respectively. The organization and arrangement of the arms 39 and 40 with respect to the body 36 and the arms 37 and 38 is such as to impart stabilizing forces to the assembly for maintaining the attitude to the suspension apparatus with respect to insulators 15, all as set forth in U.S. Application Ser. No. 23,828, idem.

The organization and arrangement of the apparatus of FIGS. 1 and 2 is such that conductor cables 11 and 12 are suspended in vertical proximity to the insulators 15. Thus, the cables are substantially at the level of the insulator 33 and the arms 37 and 38 are disposed above the level of the insulator. With the reentrant disposition and arrangement of the arms 37 and 38, the entire assemblage may move about the pin 35 for a substantial distance before the arms 37 and 38 contact the insulators 15. Further, it will be apparent that the recess 41 provides clearance space for normal swinging of the conductors about the pins 29 and 30, either with movement of the suspension plate 16 or in the absence of such movement.

The organization and arrangement of the several arms is such that the stabilizing influence of the conductors 13 and 14 minimizes the possibility of mechanical contact between the inward extremities of the arms 37 and 38 and the insulators, and, hence, the possibility of damage to the insulators as a result of movement of the cables. The design factors relevant thereto are set forth in the concurrent application previously referred to.

We have found that the arrangement of the conductor cables in the apparatus of this invention has important advantages and new results as regards the functioning of the insulators 15. Thus the disposition of the conductor cables 11 and 12 adjacent the insulator 33 produces an electric stress distribution between and about the insulators 15 such that the line voltage is divided between the several insulators in a relatively uniform way.

This effect exists to such an extent that the operating voltages of a given line incorporating the apparatus may be greatly increased without corona or other adverse effects, even at voltages substantially higher than those considered to be normal under present transmission line practice. Shielding devices and other gradient control apparatus may be eliminated and radio noise voltages are reduced to a level which is without precedent.

This result is due to the combination of several factors:

First: the spaced distribution of the several cables of the bundle conductor is such that the stress gradients at any portion of the region of the virtual conductor is relatively low, having reference to the line voltages involved.

Second: the juxta relation of the cables of the bundle conductor and the insulators 15 is such that the capacitance between each of the insulators and the conductor cables is substantially greater than the capacitance between each of the insulators and ground. Because of the short coupled relation between the top two conductors of the bundle and the suspension insulators, the capacitance between the middle insulators of the string and the cables is increased sufficiently to cause a larger increase in the charging current of those insulators relative to the increase in charging current of the insulators at the end of the string. Thus, since the distribution of charging currents due to stray capacitances from the individual insulators to ground produces a division of charging currents such that a greater proportion of the line voltage is carried by the end insulators than the middle insulators, it will be seen that the increase in capacitance between the middle insulators of the string and the line conductors promotes equal division of the line to ground voltage between the insulators of the string.

Thus the cable conductors perform the functions of the control rings of the prior art. However, because of the physical extent of the cables, the capacitance distribution results in a more uniform division of voltage between the insulators than is possible with control rings of practicable dimensions.

Finally, the portions of the suspension plate which determine the regions of greatest electrical stress concentration are those portions along the exterior of the suspension arms 37 and 38. Because of the physical proximity of the suspension arms to the insulators and to the tower the arms define regions of referred arcing. Over-voltages or impulse disturbances, such as those due to lightning, sufficient to cause arcing across the insulator string produce arcs only between the tower fittings and the suspension plate. Accordingly, damage to the conductor cables is obviated.

Figure 9:
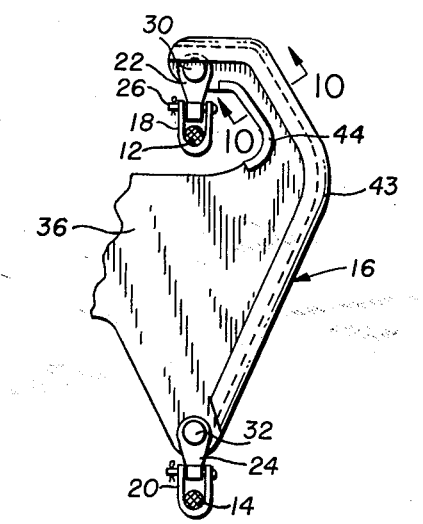
FIG. 9 illustrates a modification of the suspension plate of FIGS. 1 and 2.
Figure 8:
FIG. 8 is a sectional view of the suspension plate of FIGS. 1 and 2, taken in the direction 8—8 in FIG. 2.
Figure 10:
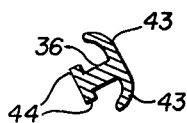
FIG. 10 is a sectional view of the suspension plate of FIG. 9, taken in the direction 10—10 in FIG. 9.

In certain circumstances special treatment of the suspension arms may be required to achieve the best corona and noise control along those parts. Thus as shown in FIG. 8, the outer extremity of the arm may be formed with a rounded surface 42. As shown in FIGS. 9 and 10, a laterally extending member 43 may be formed along the exterior of the plate 36, although such measures are required only in extreme cases. The member 44, which is joined to or integral with the body 36 along the inner edge of the arm 38 functions as a mechanical reinforcement to prevent deformation of the arm under load. Such reinforcement is desirable where the suspension plate 16 is formed from a flat metal plate.

The suspension plate 16 is manufactured by cutting or otherwise forming a flat piece of steel, aluminum, or other material having the necessary strength and dimensional stability. The suspension plate may be advantageously cast in aluminum to achieve desirable thickness and contour relations for the best mechanical strength and surface gradient distribution over the plate.

Figure 3:
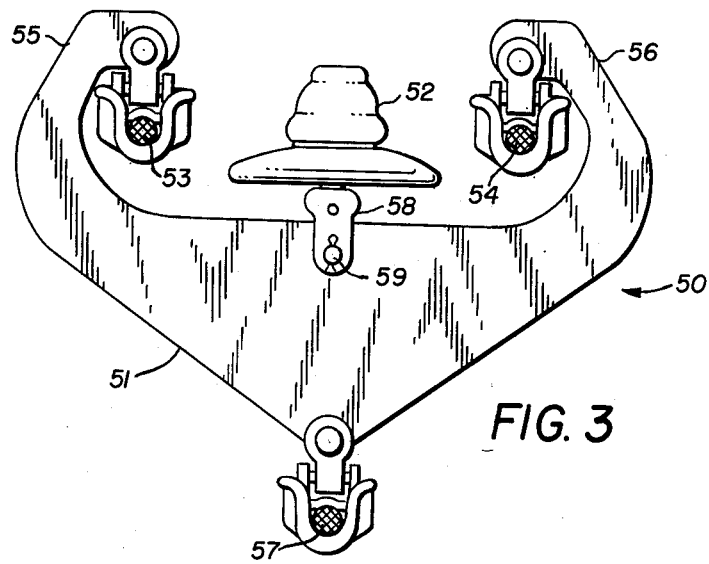
FIG. 3 illustrates an embodiment of the invention in a suspension apparatus for a three cable bundle conductor.

The apparatus 50 of FIG. 3 comprises a three cable conductor bundle in which a suspension plate 51 is suspended from an insulator 52 of a string of insulators; two top conductor cables 53 and 54 are carried on two upwardly extending arms 55 and 56 and a bottom conductor 57 is carried at the bottom of the plate 50 in alignment with the insulator 52. The insulator 52 is connected to the suspension plate 51 by means of a link 58 which is pivotally connected to the plate at the transverse center thereof by means of the pin 59. The link 58 is formed as a ball socket at the upper extremity thereof for receiving the ball of the suspension insulator and as a clevis at the lower end thereof so that the plate 51 pivots about the pin 59.

In the arrangement of FIG. 3 the top conductor cables 53 and 54 function to provide a uniform division of the line voltage between the several insulators of the suspension string, as has been described in connection with the apparatus of FIG. 2. The suspension arrangement of the cable 57 at the lower central extremity of the suspension plate 51 stabilizes the entire assembly with respect to pivotal movements about the pin 59, as set forth in application Serial No. 23,828, idem.

Figure 4:
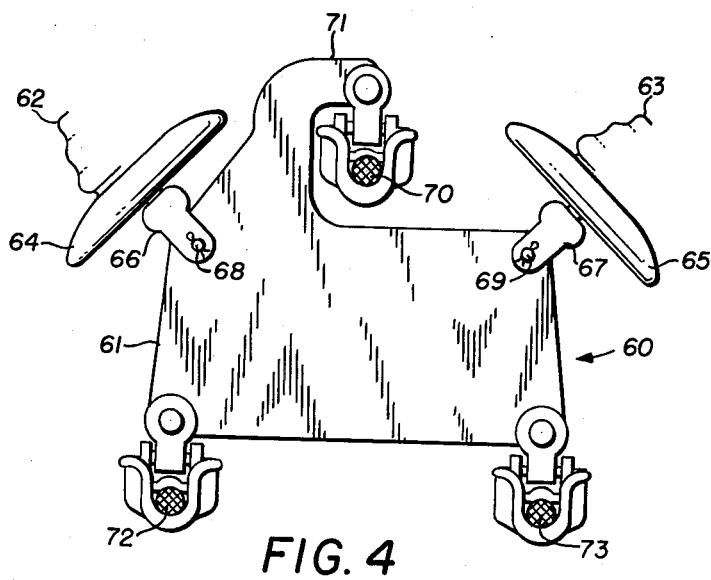
FIG. 4 illustrates an embodiment of the invention, in a suspension apparatus for a three cable bundle conductor with plural insulator strings.

The apparatus 60 of FIG. 4 comprises a three cable conductor bundle in which a suspension plate 61 is carried by two diagonally opposed insulator strings 62 and 63. The plate 61 is connected to the end insulators 64 and 65 of the respective strings by means of links 66 and 67, which are pivotally attached to the plates by means of pins 68 and 69. A single top conductor 70 is suspended from a top suspension arm 71, which extends from adjacent one side of the plate, generally parallel to the under surface of the insulator 64 and re-entrantly back toward the transverse center of the plate, so that the conductor cable 70 is carried midway between the two insulator strings. Two bottom conductors 72 and 73 are connected to the plate 61 at the bottom of the plate adjacent the transverse extremities thereof and stabilize the apparatus.

The arrangement of FIG. 4 is useful where plural strings of suspension insulators are required, because of the nature of the support structure, because of a requirement for the anti-swing characteristics of the arrangement, or because of a necessary orientation and disposition of the conductor cables. The conductor cables distribute the electric field stresses so that the line conductor voltage is divided uniformly between the several insulators in each of the strings.

Figure 5:
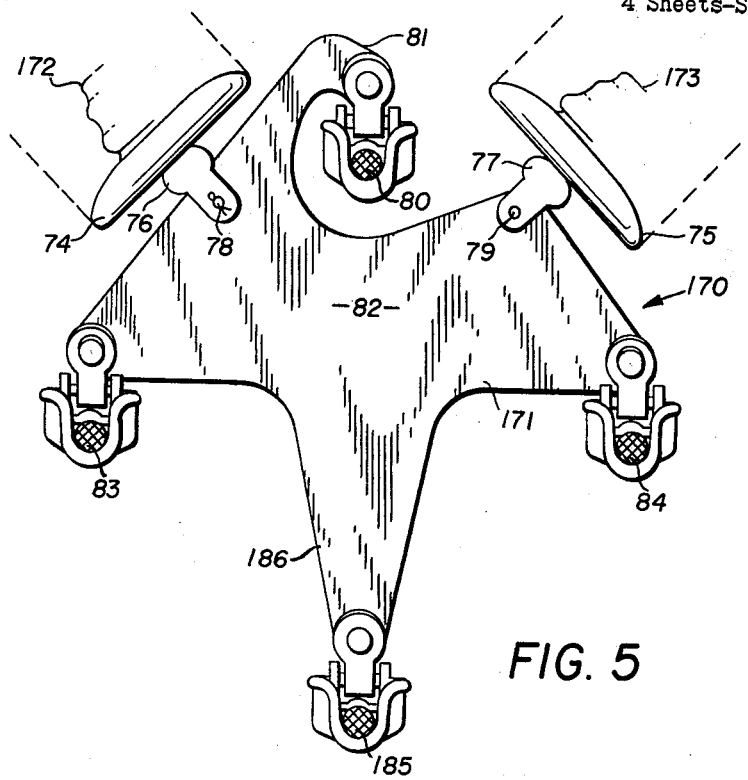
FIG. 5 illustrates an embodiment of the invention in a suspension apparatus for a four cable bundle conductor with plural suspension strings.

The apparatus 170 of FIG. 5 comprises a four cable conductor bundle in which a suspension plate 171 is carried by two diagonally opposed insulator strings 172 and 173. The plate 171 is suspended from the end insulators 74 and 75 of the respective strings by means of links 76 and 77 which are pivotally connected to the plate by means of pins 78 and 79. A single top conductor cable 80 is suspended from a top suspension arm 81, formed as one side of a generally triangular body part 82 of the plate, to carry the conductor cable 80 midway between the two strings 172 and 173. Two side conductors 83 and 84 are suspended from the lateral extremities of the body part 82 of the plate in symmetrical disposition with respect to the cable 80. A bottom conductor 185 is suspended from a bottom suspension arm 186, which extends downwardly from the body part 82 of the plate in the center part thereof. The entire arrangement of conductor cables 80, 83, 84 and 185 is symmetric in the vertical and transverse directions of the cables and the three cables 83, 84 and 185 stabilize the assembly with respect to the conductor cable 80 and pivotal movements about the pins 78 and 79. The conductor cables 80, 83 and 84 function to distribute the electric field stresses about the insulator strings 172 and 173 as has been set forth in the description of the embodiment of FIG. 4.

Figure 6:
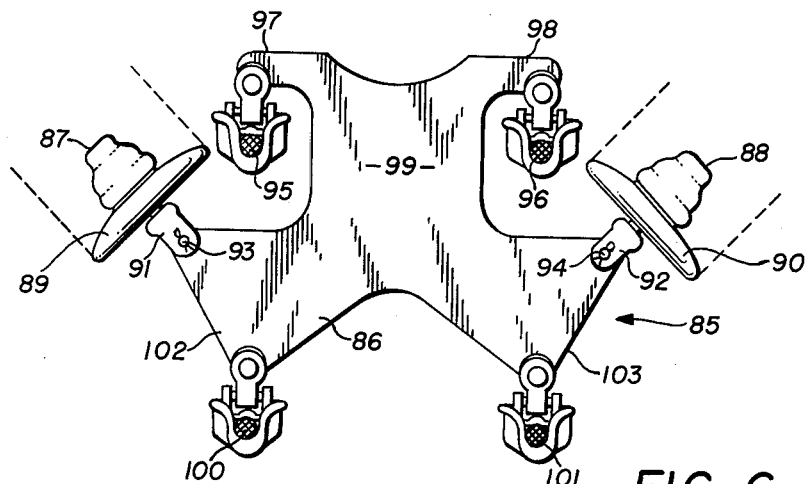
FIG. 6 illustrates another embodiment of the invention in a suspension apparatus for a four cable bundle conductor with plural suspension strings.

The apparatus 85 of FIG. 6 comprises a four cable conductor bundle in which a suspension plate 86 is carried by two diagonally opposed insulator strings 87 and 88. Plate 86 is suspended from the end insulators 89 and 90 of the respective insulator strings by means of links 91 and 92 which are pivotally connected to the suspension plate by means of pins 93 and 94. Two top conductor cables 95 and 96 are suspended from two suspension arms 97 and 98, respectively, extending transversely outward from the body part 99 of the suspension plate. Two bottom conductors 100 and 101 are suspended from two arms 102 and 103 which extend downward from the body 99 of the suspension plate 86 symmetrically at opposite sides of the vertical axis centrally through the plate. The conductor cables 100 and 101 may be disposed in vertical alignment with the conductor cables 95 and 96, as shown, or may be displaced outward by appropriate configuration of the arms 102 and 103 to increase the symmetry of the respective pairs of cables with respect to the insulator strings 87 and 88.

Figure 7:
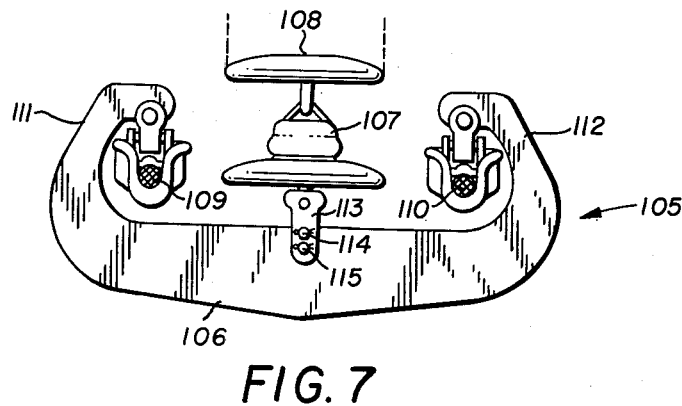
FIG. 7 illustrates an embodiment of the invention in a suspension apparatus for a two cable bundle conductor in which the insulator is rigidly connected to the suspension plate.

In FIG. 7 the apparatus 105 of the invention comprises a two cable conductor bundle in which a suspension plate 106 is carried by a string of suspension insulators 108 with the suspension pate 106 rigidly connected to an end insulator 107 of the string. Two conductor cables 109 and 110 are suspended from two suspension arms 111 and 112 which extend re-entrantly toward the insulator 107 from the transverse extremities of the suspension plate similar to the embodiment of FIG. 3. The insulator 107 is connected to the suspension plate 106 by means of a link 113, which is rigidly connected to the suspension plate by means of pins 114 and 115. The rigid connection of the apparatus 105 is particularly useful in arrangements where the stabilizing means of the prior embodiments are undesirable or unnecessary.

The apparatus of FIG. 7, with FIG. 3, particularly illustrates an important aspect of the invention. Thus by the mechanical arrangement of the suspension plate in which the conductor cables are carried above the level of the end one of the insulators, the end insulator, which would otherwise carry a greater than proportional part of the voltage across the insulator string, is brought within the shielding effect of the conductor cables, i.e. within the apparent or virtual conductor defined by the cables, to reduce the charging current of the end insulator. Simultaneously, however, the capacitance between the middle insulators of the string and the top two conductor cables is increased so that a greater part of the voltage across the insulator string is impressed upon the middle insulators than would otherwise be the case. In FIG. 3, the conductor cables 53 and 54 are above the level of the end insulator 52 so that the insulator is effectively within the region defined by the cables 53, 54 and 57. In FIG. 7 the conductor cables 109 and 110 are substantially at the level of the insulator 107 so that the same result is achieved, although to a lesser extent than in the arrangement of FIG. 3.

The level of the top extremity of the suspension plate defined by the arms, as referred to in the claims, is the level of the horizontal line perpendicular to the vertical line of symmetry of the suspension plate and insulators, for example, the top surface of the arms 37 and 38 in the suspension plate of FIG. 2.

The suspension clamps illustrated in connection with each of the embodiments of the invention are of special design to minimize corona effects. Because of the advantageous functioning of the apparatus in the relation set forth herein a suspension clamp, made according to prior designs determines the upper limit of voltage at which the line may be operated. Accordingly, the various suspension clamps are particularly designed with smooth contours and without projecting parts to reduce the corona effects and to provide a substantial increase in the upper limit of voltage in the operating system. The construction and arrangement of one form of suspension clamp useful for this purpose is set forth in another concurrent application, Serial No. 68,758, filed November 14, 1960 by Robert W. Harmon.

The features and advantages of the instant invention with respect to the apparatus in the prior art may be summarized as follows: the close proximity of the conductor system, and especially the top conductor or conductors, to the insulator string results in improved distribution of voltages along the insulator string. That is, the voltage distribution approaches the ideal situation in which each unit of the insulator string carries the same voltage in magnitude equal to the total line-to-ground voltage divided by the number of insulators in the string.

The effect of the improved voltage distribution is to decrease the voltage carried by the heretofore troublesome insulators at the energized end of the insulator string. This reduces, or even eliminates, corona discharges and radio noise interference from the insulator string.

The term "virtual conductor" as used herein refers to the continuous conductor approximated by the group of conductor cables or part conductors of a bundle conductor.

It is to be understood that the foregoing description is not intended to restrict the scope of the invention and that various rearrangements of the parts and modifications of the design may be resorted to. The following claims are directed to combinations of elements which embody the invention or inventions of this application.

We claim:

1. In transmission line apparatus, an insulator, a bundle conductor comprising a plurality of conductor cables carried by the said insulator, means for holding the conductor cables in spaced juxta relation comprising a suspension member, means for carrying two of the conductor cables adjacent the insulator comprising two arms extending from the body of the suspension member in the direction of the insulator on opposite sides thereof and means holding one of the conductor cables at the extremity of each of the two arms in proximity to the insulator, and means connecting the said insulator to the suspension member at a point below the level of the said conductor cable with the insulator adjacent the suspension member.

2. The invention in accordance with claim 1, in which the conductor cables are carried from the suspension member by means of suspension clamps having smooth rounded surfaces for defining a corona limit determined solely by the suspension member and conductor cables.

3. In transmission line apparatus, insulating means comprising a string of suspension insulators in series connection, a bundle conductor comprising a plurality of conductor cables carried by the said insulators, means for holding the conductor cables in spaced juxta relation comprising a suspension plate extending transversely between the cables, means for carrying at least one of the conductor cables adjacent the said insulators including a re-entrant arm extending from the body of the suspension plate in the direction of the insulators and spaced therefrom in the transverse direction and means suspending the said one of the conductor cables from the extremity of the arm to carry the conductor generally between the arm, the body of the plate, and the insulators, and means connecting an end one of the insulators to the suspension plate at a point below the level of the said conductor cables with the said end one of the insulators adjacent the plate.

4. The invention in accordance with claim 3 in which the suspension insulators are connected to the suspension plate centrally in the transverse direction thereof with two re-entrant arms extending from the suspension plate in the direction of and inward toward the insulators, and two conductor cables suspended one from one and one from the other of the arms adjacent the inward extremity thereof.

5. The invention in accordance with claim 4 in which a conductor cable is carried by the suspension plate adjacent the lower extremity thereof for stabilizing the assemblage.

6. The invention in accordance with claim 3 in which two strings of suspension insulators are connected to the suspension plate at transversely opposed points thereof and the said re-entrant arm extends upwardly from the suspension plate between the insulators, and the said one of the conductor cables is suspended centrally between the insulators away from the points of connection of the suspension insulators to the suspension plate.

7. The invention in accordance with claim 6 in which two conductor cables are suspended from the lateral extremities of the suspension plate below the points of connection of the suspension strings to the suspension plate, all for uniformly distributing electrical stresses between the insulators of each string and for mechanically stabilizing the assemblage.

8. The invention in accordance with claim 7 in which a suspension arm extends downward from the suspension plate centrally between the named two conductor cables and a fourth conductor cable is suspended from the said suspension arm.

9. The invention in accordance with claim 3 in which the conductor cables are carried from the suspension plate by means of suspension clamps having smooth rounded surfaces for defining a corona limit determined solely by the suspension plate and conductor cables.

10. In transmission line apparatus, insulating means comprising a string of suspension insulators in series connection, a bundle conductor comprising a plurality of conductor cables carried by the said insulators, means for holding the conductor cables in spaced juxta relation comprising a suspension plate extending transversely between the cables, means for holding at least one of the conductor cables adjacent the said insulators including a re-entrant arm extending from the body of the suspension plate in the direction of the insulators and spaced therefrom in the transverse direction and means suspending the said one of the conductor cables from the extremity of the arm to carry the conductor generally between the arm, the body of the plate, and the insulators, means pivotally connecting an end one of the insulators to the suspension plate at a point below the level of the said conductor cable and adjacent the suspension plate, and means connected to the said suspension plate below the said connecting means for stabilizing the suspension plate and said one conductor against swinging movements with respect to the said insulators.

11. The invention in accordance with claim 10 in which the said stabilizing means comprises at least one conductor cable.

12. The invention in accordance with claim 10 in which the said stabilizing means comprises two conductor cables of the said bundle conductor carried from the suspension plate at symmetrical, transversely opposed portions thereof with respect to the connecting means.

13. The invention in accordance with claim 10 in which there are two strings of suspension insulators pivotally connected to the suspension plate at transversely opposed points thereof, the said one of the conductor cables is supported centrally between the two insulator strings above the points of connection of the said strings to the plate, and two conductor cables are carried by the suspension plate at transversely opposed portions thereof below the points of connection of the said strings to the suspension plate, and each symmetrically disposed with the said first named conductor cable with respect to the adjacent one of the insulator strings, all for uniformly distributing electrical stresses between the insulators of each string and for mechanically stabilizing the assemblage.

14. The invention in accordance with claim 13 in which a suspension arm extends downward from the suspension plate below the named two conductor cables and a fourth conductor cable is suspended from the said suspension arm.

15. In transmission line apparatus, insulating means comprising a plurality of insulators in series connection, a suspension plate carried by the insulators comprising a body and an arm extending away from the body in the direction of the insulators, means connecting an end insulator to the body of the plate, a conductor cable carried by the said arm between the arm and the insulators, and suspension means therefor connected to the said arm, at least the said end one of the insulators being disposed generally below the level of the top extremity of the plate defined by the said arm and the said insulators being thereby connected in short coupled relation to the suspension plate and the conductor cable being thereby disposed adjacent the insulators, all for uniformly dividing the voltage between the several insulators when the conductor cable is energized.

16. The invention in accordance with claim 15 in which two arms are arranged on opposite sides of the suspension plate equally spaced from the insulators and extending symmetrically toward the insulators and two conductor cables are suspended one from one and one from the other of the arms.

17. The invention in accordance with claim 16 in which the said means connecting the string to the suspension plate has a pivotal connection to the suspension plate centrally in the transverse direction of the plate with means connected to the suspension plate at the extremity thereof away from the insulators for stabilizing the assembly against pivotal movements thereof with respect to the insulators.

18. The invention in accordance with claim 15 in which the said means connecting the string to the suspension plate has a pivotal connection to the suspension plate centrally in the transverse direction of the plate with means connected to the suspension plate at the extremity thereof away from the insulators for stabilizing the assembly against pivotal movements thereof with respect to the insulators.

19. The invention in accordance with claim 15 in which the conductor cable is disposed above the level of an end one of the insulators for increasing the capacitance between the cable and the insulators at the middle of the string.

20. In transmission line apparatus, a suspension string constituted by a plurality of insulators in series connection, a suspension plate carried by the string comprising a body and, two arms extending away from the body in the direction of the insulators on opposite sides of and re-entrantly toward the insulators, means pivotally connecting an end insulator of the string to the body of the plate centrally in the transverse direction thereof, at least the said end one of the insulators being disposed below the level of the top extremity of the suspension plate defined by the said two arms, two conductor cables arranged generally between the said arms, plate, and insulators, and suspension means therefor connected to the said arms, the said conductor cables thereby being disposed adjacent the insulators to increase the capacitance between the conductor cables and the insulators at the middle of the string for uniformly dividing the voltage across the string between the several insulators when the conductor cables are energized, and means carried by the suspension plate at the lower extremity thereof for stabilizing the assembly against pivotal movements thereof with respect to the insulators, the said conductor cables constituting part conductors held in mechanically spaced and electrically equal relation by the said suspension plate.

21. The invention in accordance with claim 20 in which the said conductor cables are disposed above the level of an end one of the insulators for increasing the capacitance between the cable and the insulators at the middle of the spring and the said end one of the insulators is disposed within the virtual conductor defined by the conductor cables to reduce the charging current of the said insulator.

22. Means for use with the conductor cables and suspension insulators in a bundle line conductor comprising a body having means for connecting an insulator at the central part thereof, and means for suspending conductor cables adjacent to and on each side of the insulator comprising two arms extending from the body in the direction of the insulator and having the extremities thereof extending re-entrantly inward in spaced relation to the body and to the insulator.

23. The invention in accordance with claim 22 in which the arms are each reinforced against mechanical deformation by a perpendicularly extending part integrally joined to the arm along the interior thereof from the body to adjacent the extremities thereof.

24. The invention in accordance with claim 23 in which the transverse extremities of the body and of the arms are formed with shield pieces extending equally in both perpendicular directions from the plate for minimizing corona formation.

25. The invention in accordance with claim 22 in which the outside edges of the body and of the arms at the transverse extremities of the plate are rounded to minimize corona discharges therefrom.

26. The invention in accordance with claim 22 in which the transverse extremities of the body and of the arms are formed with shield pieces extending in the perpendicular direction from the plate for minimizing corona formation.

27. Means for carrying a bundle line conductor by means of a plurality of strings of insulators comprising a body part having means for connecting separate strings of suspension insulators at transversely opposite sides thereof, and means for suspending a conductor cable between the two strings of insulators and above the said connecting means for the strings comprising an arm extending from one side of the body in re-entrantly spaced relation from the body to the transverse center thereof.

28. A suspension plate for suspending bundled line conductors by means of a plurality of strings of insulators comprising a unitary body part having means for connecting separate strings of suspension insulators at transversely opposite sides thereof, and means for suspending two conductor cables between the two strings of insulators and above the said connecting means for the string comprising two arms extending from the body centrally thereof symmetrically outward from the body toward the strings for supporting the two cables in transversely spaced relation each to the other and each between the adjacent insulator of the string of insulators and the body of the plate.

References Cited in the file of this patent

UNITED STATES PATENTS

| | | |
|---|---|---|
| 1,078,711 | Whitehead | Nov. 18, 1913 |
| 2,820,083 | Hendrix | Jan. 14, 1958 |
| 2,865,982 | McCoy et al. | Dec. 23, 1958 |

FOREIGN PATENTS

| | | |
|---|---|---|
| 597,417 | Germany | May 24, 1934 |
| 181,889 | Austria | May 10, 1955 |